(12) United States Patent
Dubuisson et al.

(10) Patent No.: US 11,440,485 B2
(45) Date of Patent: Sep. 13, 2022

(54) RETAINING ASSEMBLY FOR A TRIM ELEMENT OF A VEHICLE

(71) Applicant: NOVARES France, Clamart (FR)

(72) Inventors: Eric Dubuisson, Roquebrune Cap Martin (FR); Sébastien Rebillon, Nice (FR)

(73) Assignee: NOVARES FRANCE, Clamart (FR)

( * ) Notice: Subject to any disclaimer, the term of this patent is extended or adjusted under 35 U.S.C. 154(b) by 880 days.

(21) Appl. No.: 16/303,366

(22) PCT Filed: May 11, 2017

(86) PCT No.: PCT/FR2017/051122
§ 371 (c)(1),
(2) Date: Nov. 20, 2018

(87) PCT Pub. No.: WO2017/203121
PCT Pub. Date: Nov. 30, 2017

(65) Prior Publication Data
US 2020/0391674 A1    Dec. 17, 2020

(30) Foreign Application Priority Data

May 26, 2016 (FR) ...................................... 16/54742

(51) Int. Cl.
*B60R 13/02* (2006.01)
*B60R 21/21* (2011.01)

(52) U.S. Cl.
CPC ...... *B60R 13/0206* (2013.01); *B60R 13/0237* (2013.01); *B60R 21/21* (2013.01); *B60R 2013/0287* (2013.01)

(58) Field of Classification Search
CPC . B60R 13/0206; B60R 13/0237; B60R 21/21; B60R 2013/0287; B60R 13/025; B60R 21/213; B60R 21/216
See application file for complete search history.

(56) References Cited

U.S. PATENT DOCUMENTS

| 6,145,870 A | * | 11/2000 | Devane | ................. | B60R 21/213 |
| | | | | | 280/728.2 |
| 6,402,188 B1 | * | 6/2002 | Pasch | ................... | B60R 21/215 |
| | | | | | 280/728.1 |

(Continued)

FOREIGN PATENT DOCUMENTS

| DE | 10001444 | 7/2001 |
| DE | 102009049361 | 4/2011 |

(Continued)

OTHER PUBLICATIONS

English Machine Translation to Abstract of DE10001444.

(Continued)

*Primary Examiner* — Darlene P Condra
(74) *Attorney, Agent, or Firm* — Cantor Colburn LLP

(57) ABSTRACT

It comprises: —a clip holder (4) entirely integral with the trim element (1), comprising: —a proximal portion (5) connected to the trim element (1), and—a distal portion (6) on which is fitted a clip (8) that is shaped so as to secure to a body element (2), the proximal portion (5) and the distal portion (6) being joined by a breakable region (9) that is designed to break in the event of deployment of an airbag (3), and the distal portion (6) being able to move between a rest position in which the breakable region (9) joins the distal portion (6) to the proximal portion (5) and a deployment position in which the distal portion (6) is no longer joined to the proximal portion (5) by virtue of the breakable region (9) breaking, and—a retention element (11) that is designed to retain the distal portion (6) on the trim element (1) when the distal portion (6) is in the deployment position.

16 Claims, 4 Drawing Sheets

(56) References Cited

U.S. PATENT DOCUMENTS

| | | | | |
|---|---|---|---|---|
| 6,431,585 | B1* | 8/2002 | Rickabus | B60R 21/215 |
| | | | | 24/114.05 |
| 7,178,205 | B2* | 2/2007 | Nessel | B60R 13/0206 |
| | | | | 24/289 |
| 7,717,458 | B2* | 5/2010 | Tsuge | B60R 13/02 |
| | | | | 280/728.2 |
| 8,220,827 | B2* | 7/2012 | Schirm | B60R 21/216 |
| | | | | 280/728.2 |
| 9,145,101 | B2* | 9/2015 | Gillay | B60R 21/2338 |
| 9,821,747 | B2* | 11/2017 | Benedetti | F16B 21/075 |
| 11,015,632 | B2* | 5/2021 | De Jong | F16B 2/243 |
| 11,084,448 | B2* | 8/2021 | Bacelos | B60R 21/213 |

FOREIGN PATENT DOCUMENTS

| | | |
|---|---|---|
| EP | 0873916 A1 | 10/1998 |
| JP | 2004161141 A | 6/2004 |

OTHER PUBLICATIONS

English Machine Translation toAbstract of DE 102009049361.
English Machine Translation toAbstract of JP2004161141.
International Search Report for Application No. PCT/FR2017/051122.

* cited by examiner

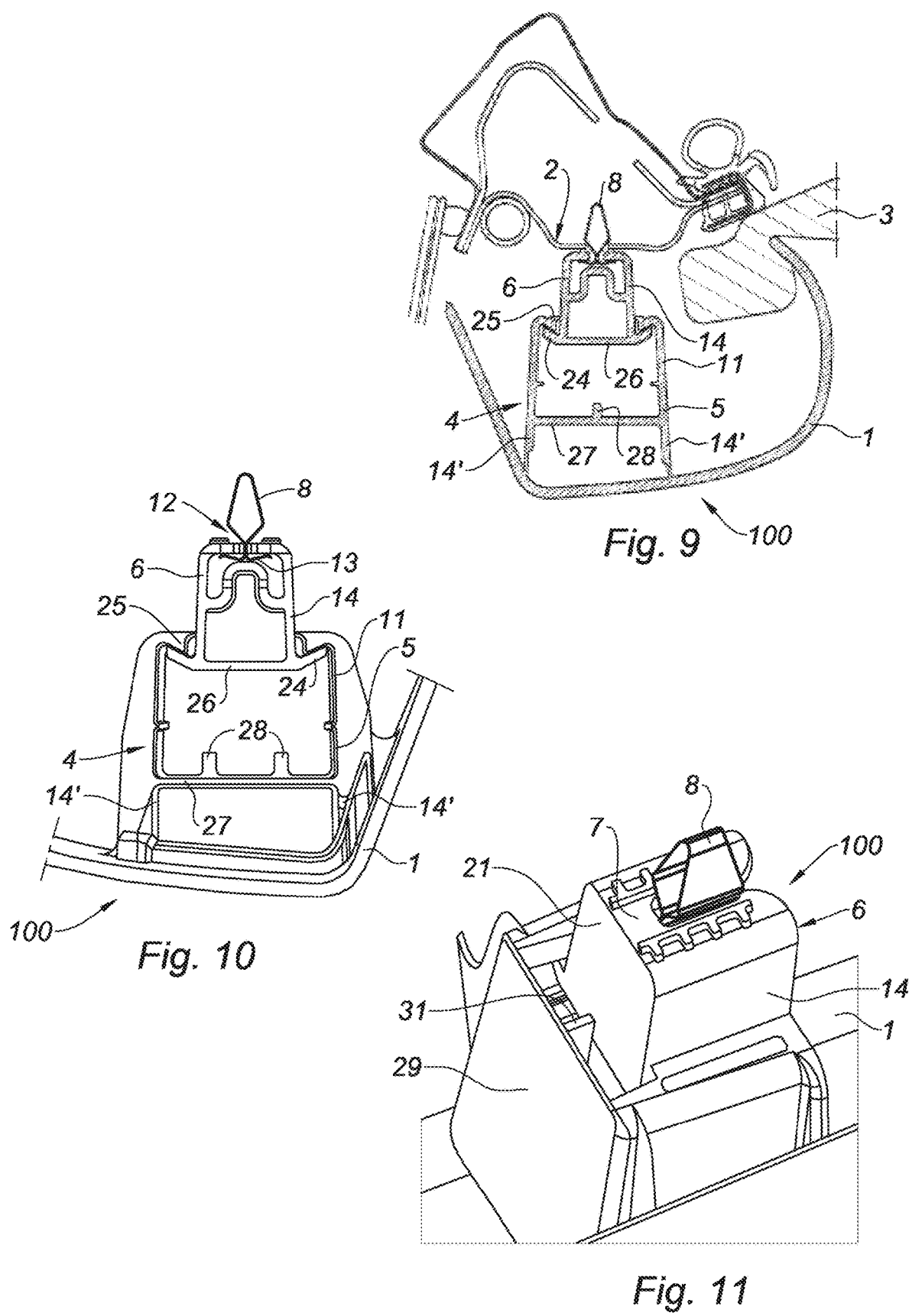

RETAINING ASSEMBLY FOR A TRIM ELEMENT OF A VEHICLE

CROSS REFERENCE TO RELATED APPLICATIONS

This application is a National Stage of PCT Application No. PCT/FR2017/051122 filed on May 11, 2017, which claims priority to French Patent Application No. 16/54742 filed on May 26, 2017, the contents each of which are incorporated herein by reference thereto.

TECHNICAL FIELD

The present invention concerns a retaining assembly for retaining a trim element to a bodywork element of a vehicle upon deployment of an airbag interposed between the trim element and the bodywork element. The invention also concerns a vehicle equipped with this retaining assembly including a trim element and a bodywork element.

An inflatable safety cushion, or airbag, is an envelope commonly called bladder, in which is injected a gas generated by an explosive chemical reaction, which develops very quickly while inflating it. The airbags are especially used in the automotive field to protect the vehicle occupants upon a collision.

In the case of an airbag, the cushion in its folded position is interposed between a bodywork element of the vehicle forming a body side and a trim member of the vehicle, mounted on this bodywork element, and which hides the cushion. Upon detection of a collision, the cushion inflates by injection of gas therewithin. The cushion deploys and moves away the trim element. This sometimes causes the deformation of the trim element which is detached from the bodywork element in the passenger compartment. So that the trim element does not constitute a projectile that could injure one of the vehicle occupants, it is necessary to retain the trim element to the bodywork element while allowing the deployment of the airbag.

To this end, it is known to use an assembly for retaining a trim element to a bodywork element between which the airbag is sandwiched. This assembly typically comprises a clip-holder mounted on a trim element and a clip snap-fitted on the clip-holder and on the bodywork element. This specific clip differs from conventional clips used for a simple mounting of the trim element on the bodywork element. This specific clip in the presence of the airbag is frequently configured for a partial snap-off from the bodywork element, so as to enable a controlled displacement of the trim element. This specific clip may have two sites for snap-fitting with the bodywork element. These two sites are so large that using the specific clip could be impossible depending on the shape of the trim element. In addition, the bulk generated by this volume between the trim element and the bodywork element reduces the interspace, so as to make the latter insufficient for the deployment of the airbag in proper conditions. Moreover, all the specific clips available on the market are significantly more expensive than the conventional clips.

BACKGROUND

One of the aims of the present invention is to overcome at least one of these drawbacks. To this end, the invention proposes a retaining assembly for retaining a trim element to a bodywork element of a vehicle between which an airbag is intended to be interposed, the retaining assembly comprising:
a clip-holder made integrally in one piece with the trim element, comprising:
a proximal portion connected to the trim element, and
a distal portion on which is mounted a clip shaped for fastening to the bodywork element,
the proximal portion and the distal portion being secured via a frangible region configured to break up upon deployment of the airbag, and the distal portion being displaceable between a rest position in which the frangible region secures the distal portion and the proximal portion and a deployment position in which the distal portion is disengaged from the proximal portion by breakage of the frangible region, and
a retaining element configured to retain the distal portion to the trim element when the distal portion is in the deployment position.

Thus, in the configuration of this retaining assembly, when a shock is detected in the vehicle and the deployment of the airbag is activated, the distal portion is detached from the proximal portion and is displaced from its rest position to its deployment position, while being retained in its stroke by the retaining element. This displacement allows the separation of the trim element relative to the bodywork element in order to facilitate the deployment of the airbag. The retaining assembly thus allows avoiding the projection of the trim element despite the opening speed of the airbag (in the range of 300 km/h) and the magnitude of the associated forces. Thus, the deployable clip-holder makes the use of a standard clip possible while forming a small-size retaining assembly, allowing the unimpeded deployment of the airbag.

According to one arrangement, the retaining element is disposed inside the volume delimited by the clip-holder with the distal portion in the rest position, so as to limit its bulk.

According to another arrangement, the retaining element is disposed outside the volume delimited by the clip-holder in the rest position of the distal portion in order to facilitate its mounting. In addition, when the retaining element is flexible, the bulk likely to be generated by this positioning is not significant.

According to one possibility, the retaining element is made in one piece with the trim element, which simplifies the manufacturing method and limits the number of steps.

Advantageously, the frangible region comprises a breakable material area configured to break up upon deployment of the airbag and to disengage the distal portion from the proximal portion. The frangible region is simple to manufacture and the operation of the retaining assembly is reliable.

Preferably the distal portion comprises a mounting wall provided with a mounting orifice and configured to cooperate with a complementary mounting member provided on the clip for mounting the clip on the distal portion. When the used clip is a standard-type one, the complementary mounting member is a snap-fitting element which simply cooperates with the mounting orifice.

Advantageously, the retaining assembly comprises a support portion generally having a U-shape, disposed opposite the complementary mounting member of the clip mounted on the mounting wall, the support portion being configured to support the mounting member of the clip when it is fastened on the bodywork element. This configuration actually allows to the clip to be held in the mounting orifice upon its forced snap-fitting in the bodywork element, which participates to the proper fastening of the trim element to the bodywork element.

Preferably, the retaining assembly comprises breakable material bridges connecting the retaining element to the distal portion in the rest position, these material bridges being configured to break up when the distal portion is displaced in the deployment position. These material bridges enhance the stability of the assembly in the rest position and participate to reduce the risks of breakage of the frangible region upon fastening of the clip to the bodywork element.

According to one arrangement, the distal portion comprises a stop member configured to bear against a complementary stop member provided on the retaining element when the distal portion is in the deployment position. This configuration allows providing mechanical strength intended to effectively resist the stroke of the distal portion and to stop it upon deployment of the airbag. Thus, the projection of the trim element into the passenger compartment is avoided yet without affecting the deployment of the airbag.

According to one possibility, the distal portion comprises two side walls facing each other, attached to two opposite peripheral sides of the mounting wall and the support portion is connected to the two side walls by a return portion. This configuration contributes to the resistance of this part which may be subjected to extreme loads. This return portion is advantageously configured to provide flexibility to the support portion upon fastening of the clip on the bodywork element and to avoid breakage of the frangible region.

According to another variant, the support portion is connected to the proximal portion by a return portion, so as to ensure good mechanical resistance to the retaining assembly upon fastening of the clip.

Advantageously, the distal portion comprises a lower wall connected to the mounting wall by two side walls, and the proximal portion comprises at least one bearing stud disposed opposite the lower wall, the at least one bearing stud being configured to enable a bearing of the lower wall when the clip is fastened to the bodywork element. This configuration contributes to absorb the forces generated on the clip-holder upon fastening of the clip to the bodywork element, so that the frangible region is preserved. Of course, the proximal portion may comprise two bearing stud, and furthermore, in order to increase the stability of the retaining assembly in the rest position of the distal part.

Preferably, the distal portion comprises a bottom wall connecting the two side walls, and the retaining assembly further comprises a bottom face extending substantially parallel to the bottom wall, the bottom face comprising a guide rib configured to guide the displacement of the bottom wall of the distal portion from its rest position to its deployment position.

According to a variant, the retaining element comprises an elastic member configured to take on a compressed position when the distal portion is in the rest position, and a loose position, when the distal portion is in the deployment position, in which the length of the elastic member is greater than the length of the elastic member in the compressed position.

Advantageously, the elastic member is disposed in the internal volume delimited by the clip-holder when the frangible region is not broken.

In order to reinforce the mechanical resistance of the retaining assembly, the elastic member comprises at least one point for attachment to the proximal portion and at least one point for attachment to the distal portion.

According to yet another variant, the retaining element comprises a flexible cord where a first end region of the cord is connected to the distal portion and a second end region is connected to the proximal portion of the clip-holder, the cord being configured to take on a loose position when the distal portion is in the rest position, in which the cord is loosened, and a stretched position when the distal portion is in the deployment position, in which the cord is extended. In the stretched position, the cord is thus an effective retaining element of the proximal portion and the trim element.

According to one possibility, the flexible cord is disposed in the internal volume delimited by the clip-holder in the rest position of the distal portion, which advantageously limits the bulk within the trim element.

According to a variant, the flexible cord is disposed at the external periphery of the clip-holder when the distal portion is in the rest position, so that the mounting is simplified and manufacturing costs are reduced.

According to one arrangement, the flexible cord comprises polyester fibers.

According to a second aspect, the invention also concerns a vehicle comprising:
a bodywork element,
a trim element, and
a retaining assembly as previously described.

Advantageously, the trim element and the clip-holder are integral and comprise a plastic material such as polypropylene. This embodiment allows a rapid manufacture without adding a processing step in the manufacture of cabinetwork, in a well-known material in the field of automotive equipment, which is lightweight and economical.

BRIEF DESCRIPTION OF THE DRAWINGS

Other aspects, objects and advantages of the present invention will become more apparent upon reading the following description of different embodiments thereof, given as non-limiting examples and made with reference to the appended drawings. The figures are not necessarily to scale for all the represented elements in order to improve readability. In the remainder of the description, for simplification, identical, similar or equivalent elements of the different embodiments bear the same reference numerals.

FIGS. 8 and 9 illustrate a partial perspective view of a retaining assembly according to a fourth embodiment of the present invention, respectively in the rest position and in the deployment position.

FIG. 10 illustrates a partial perspective view of the retaining assembly illustrated in FIG. 9 in the deployment position, according to a variant of the invention.

FIG. 11 illustrates a perspective schematic view of a retaining assembly according to a variant of the present invention.

DETAILED DESCRIPTION

Figure 1:
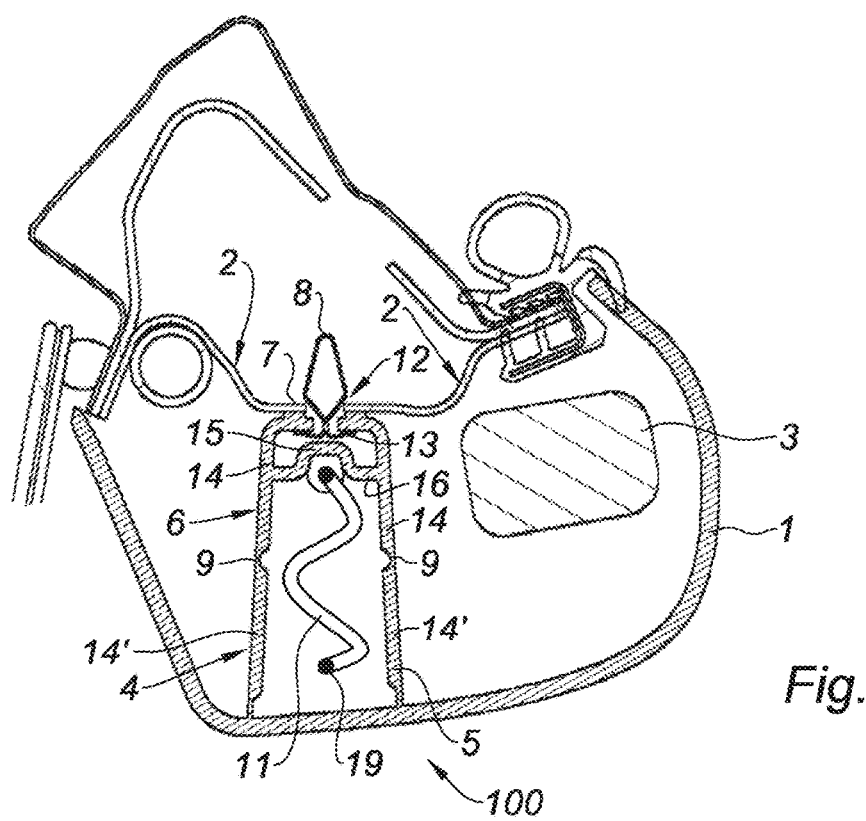
FIGS. 1 and 2 illustrate a sectional view of a retaining assembly according to an embodiment of the present invention, respectively in the rest position and in the deployment position.

FIG. 1 illustrates a retaining assembly 100 disposed in a vehicle for retaining a trim element 1 to a bodywork element 2 upon deployment of an airbag 3, interposed between the trim element 1 and the bodywork element 2. The retaining assembly 100 comprises a clip-holder 4 composed by a proximal portion 5, directly linked to the trim element 1, and a distal portion 6 comprising a mounting wall 7 on which is mounted a clip 8 for fastening to a bodywork element 2 of the vehicle, thus connecting the distal portion 6 to the bodywork element 2. The distal portion 6 is configured to be displaced between a rest position (FIG. 1), in which it is secured to the proximal portion 5 by a frangible region 9, and a deployment position (FIG. 2) in which the distal portion 6 is disengaged from the proximal portion 5 by breakage of the frangible region 9. This frangible region 9 actually comprises a breakable material area, configured to break up upon deployment of the airbag 3 and to enable the displacement of the distal portion 6 in its deployment position.

The clip-holder 4 also comprises a retaining element 11 configured to retain the distal portion 6 to the trim element 1 when the distal portion 6 is in the deployment position.

The mounting wall 7 of the distal portion 6 is provided with a mounting orifice 12 through which is mounted a complementary mounting member 13 such as a snap-fitting member, provided on the clip 8. According to a non-illustrated arrangement, other means suited for mounting the clip 8 on the mounting wall 7 may be used.

The distal portion 6 comprises two side walls 14 extending face to face by joining the two peripheral and opposite sides of the mounting wall 7. The proximal portion 5 comprises two distinct lower side walls 14', each joining a respective lateral wall 14 of the distal portion 6 via the frangible region 9. In the embodiment illustrated in FIGS. 1 and 2, the side wall 14 of the distal portion 6 extends substantially in the extension of the respective lower side wall 14' of the proximal portion 5.

Also illustrated in FIG. 1, the clip-holder 4 comprises a support portion 15 generally having a U-shape (in a reverse position with respect to the clip 8) disposed opposite the complementary mounting member 13 of the clip 8, when the latter is mounted on the mounting wall 7, so as to support the complementary mounting member 13 upon fastening of the clip 8 to the bodywork element 2. According to the configuration illustrated in FIG. 1, the support portion 15 is connected to both side walls 14 of the distal portion 6 by a return portion 16. This configuration allows maintaining the clip 8 in place in the mounting wall 7 of the clip-holder 4 upon its attachment to the bodywork element 2, while preserving the frangible region 9 due to the resilient flexibility provided at the level of the return portion 16.

Figure 2:
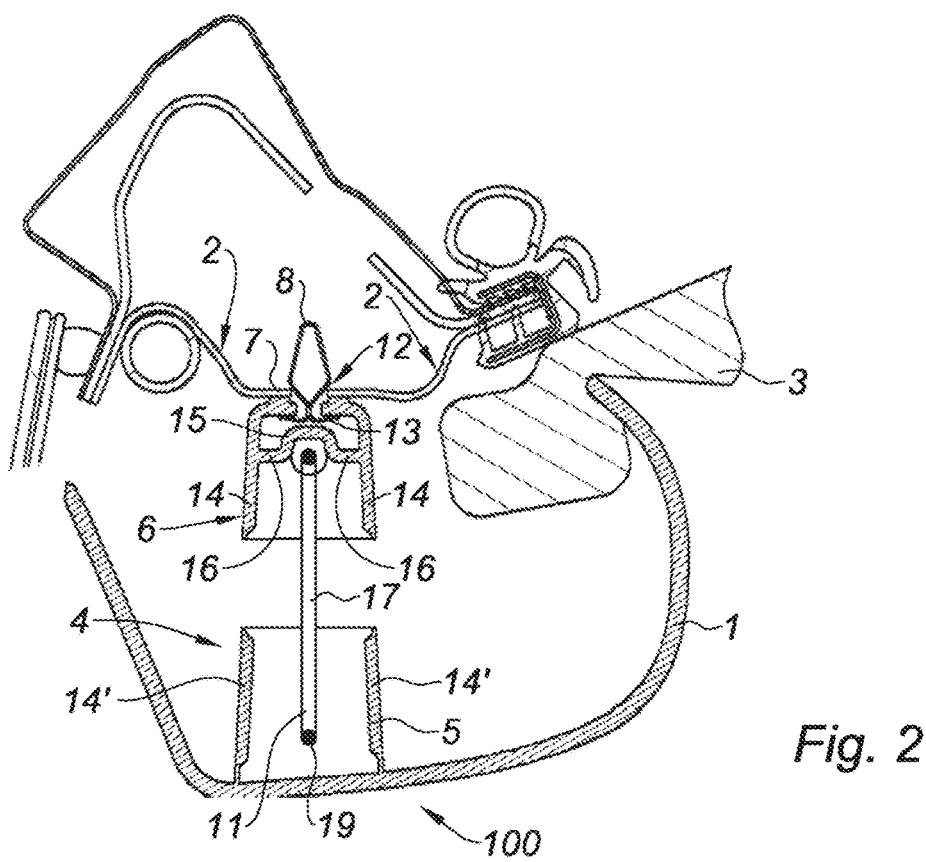

As illustrated in FIGS. 1 and 2, the retaining element 11 comprises a flexible cord 17 disposed in the internal volume delimited by the clip-holder 4 in the rest position of the distal portion 6. A first end region of the cord 17 is connected to the distal portion 6 and a second end region is connected to the proximal portion 5 of the clip-holder 4, the cord 17 being configured to take on a loose position when the distal portion 6 is in the rest position, in which the cord 17 is loosened (FIG. 1). When the airbag 3 is deployed, the frangible region is broken, the distal portion 6 is in the deployment position, and the cord 17 is in the stretched position that is to say that it is extended so as to retain the distal portion 6 of the trim element 1 (FIG. 2). The first end region of the cord 17 comprises a sphere 18 (shown in FIG. 3) whose diameter is larger than that of an orifice formed in the distal portion 6 and intended for the passage of the cord 17, so as to maintain the sphere 18 hooked to the distal portion 6. The second end region comprises a snap-fitting element 19 (also shown in FIG. 3) configured to cooperate and to be retained by an orifice formed in the proximal portion 5. This configuration allows facilitating the mounting and the dismounting of the cord 17 to the clip-holder 4.

Figure 3:
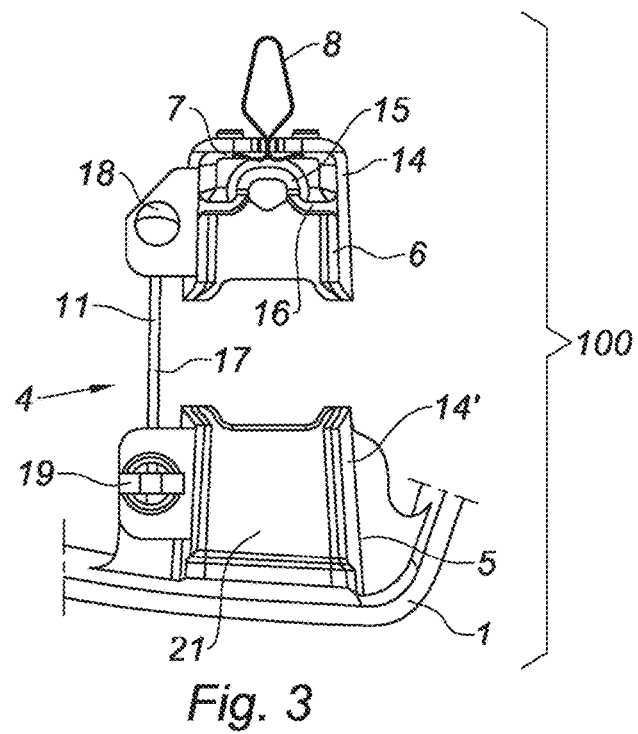
FIG. 3 illustrates a partial perspective view of the retaining assembly illustrated in FIG. 2 in the deployment position according to a variant of the invention.

According to a variant illustrated in FIG. 3, the retaining element 11 is a cord 17 connecting the distal portion 6 to the proximal portion 5 while being disposed outside the volume delimited by the clip-holder 4 in the rest position of the distal portion 6.

According to one possibility of the invention, illustrated in particular in FIG. 3, the distal portion 6 and/or the proximal portion 5 comprise a bottom wall 21 made integrally in one piece with the clip-holder 4, allowing enhancing its mechanical rigidity.

Figure 4:
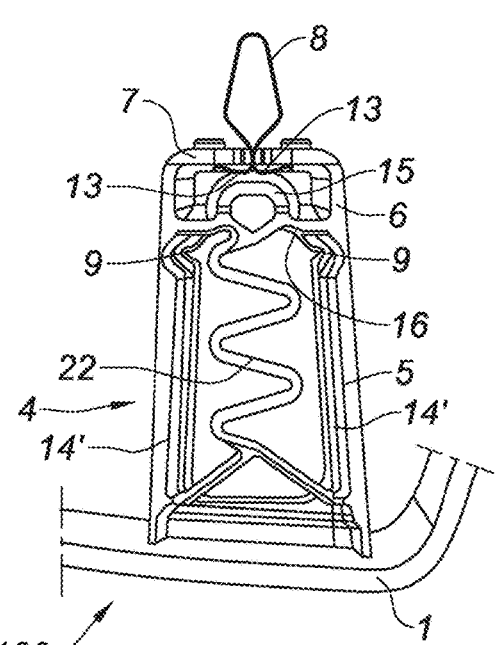
FIGS. 4 and 5 illustrate a partial perspective view of a retaining assembly according to a second embodiment of the invention, respectively in the rest and deployment positions.
Figure 5:
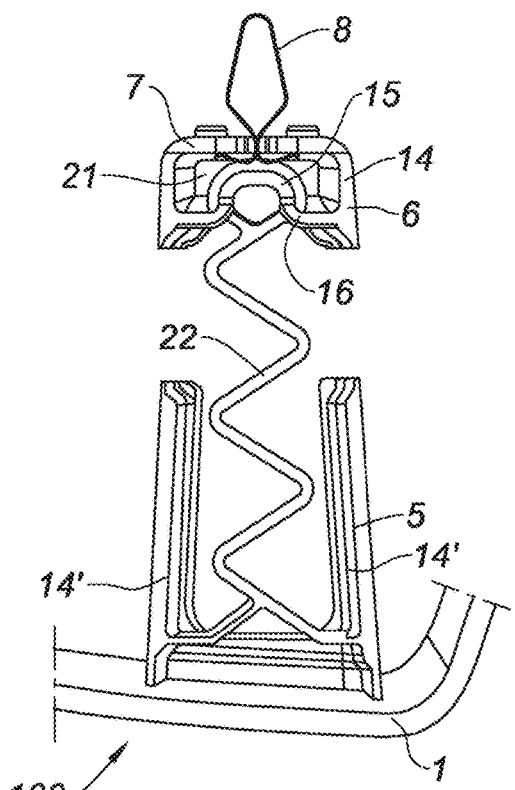

FIGS. 4 and 5 illustrate a second embodiment of the invention which differs from the previous one in particular in that the retaining element 11 comprises an elastic member 22 configured to take on a compressed position when the distal portion 6 is in the rest position, and a loose position, when the distal portion 6 is in the deployment position, in which the length of the elastic member 22 is greater than the length of the elastic member 22 in the compressed position. As shown in FIGS. 4 and 5, the two opposite end regions of the elastic member 22 are divided into two portions to form two distinct points for attachment, respectively to the proximal portion 5 and to the distal portion 6. This configuration allows guaranteeing the mechanical strength of the retaining element 11 upon deployment of the airbag 3. According to a non-illustrated arrangement, the elastic member 22 comprises only but one point for attachment respectively to the proximal portion 5 and to the distal portion 6.

Figure 6:
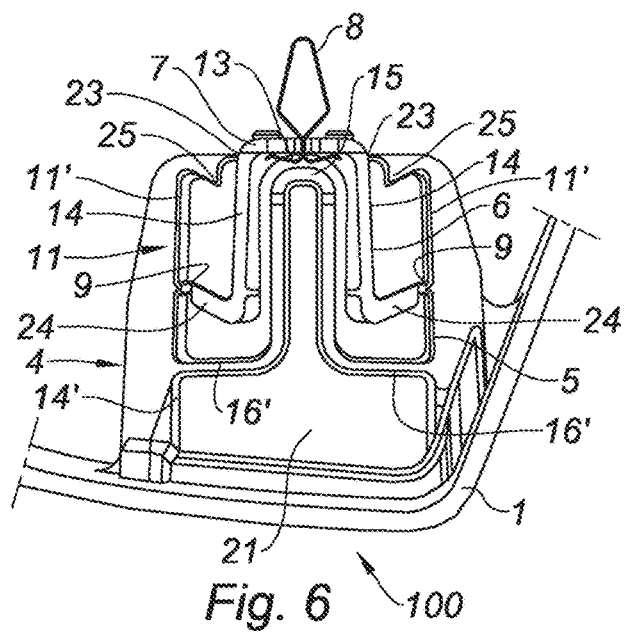
FIGS. 6 and 7 illustrate a partial perspective view of a retaining assembly according to a third embodiment of the present invention, respectively in the rest position and in the deployment position.
Figure 7:
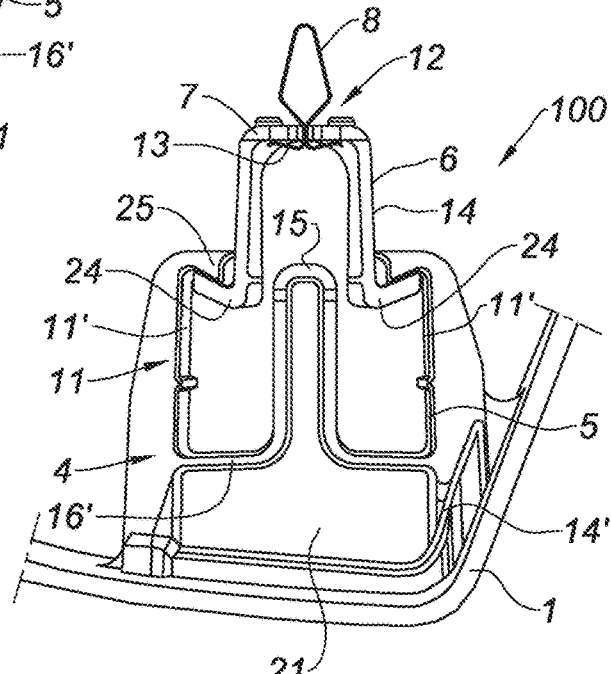

FIGS. 6 and 7 illustrate a third embodiment of the invention in which the support portion 15, disposed opposite the complementary mounting member 13 of the clip 8, is attached via a return portion 16' to the two lower side walls 14' of the proximal portion 5. In addition, the distal portion 6 in the rest position is linked to the retaining element 11 via breakable material bridges 23 forming a link with each of the side walls 14, and configured to break up upon deployment of the airbag 3 and to enable the displacement of the distal portion 6 from its rest position to its deployment position. The distal portion 6 also comprises a stop member 24 formed in the lower extension of each of the side walls 14. Each stop member 24 comprises an end portion connected to a respective vertical wall 14' of the proximal portion 5 by a frangible region 9. These stop members 24 are shaped so as to abut against the complementary stop members 25 formed on the retaining element 11 and to retain the distal portion 6 in the deployment position. More specifically, the retaining element 11 comprises at least two distinct retaining portions 11', each of the two retaining portions 11' extending in the extension of one of the two lower side walls 14' of the proximal portion 5. Each of the retaining portions 11' comprises a complementary stop member 25 formed by an end region having a return element.

FIG. 7 illustrates the retaining assembly 100 of FIG. 6 when the distal portion 6 is in the deployment position: the distal portion 6 is disengaged from the proximal portion 5 by breakage of the frangible region 9, and from the retaining parts 11' by breakage of the material bridges 23. The stop member 24 bears against the complementary stop member 25 of the retaining element 11 which allows retaining the trim element 1 to the bodywork element 2.

Figure 8:
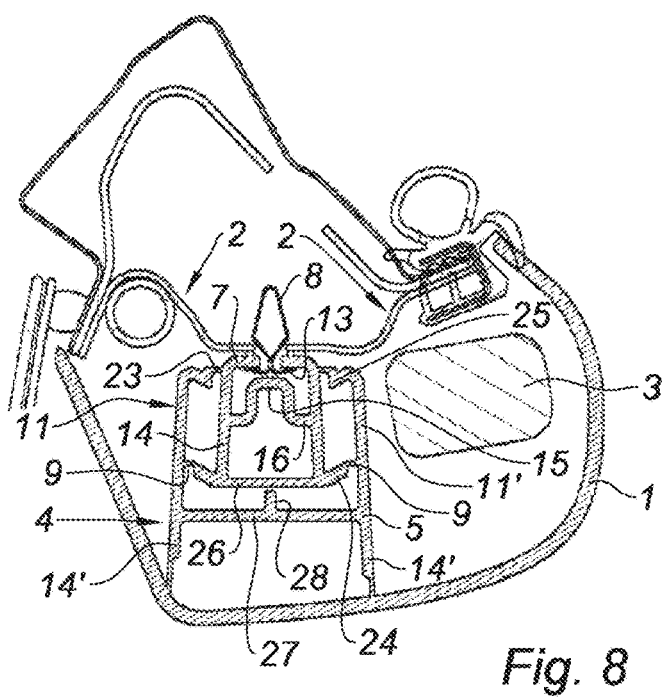

FIGS. 8 and 9 illustrate an embodiment which differs from the previous one in particular in that the support portion 15 is attached to the side walls 14 of the distal portion 6 by a return portion 16. The distal portion 6 further comprises a lower wall 26, extending substantially parallel to the mounting wall 7 and connected to the latter via the two side walls 14. This lower wall 26 is extended on either side of the two side walls 14 by the stop member 24.

In this embodiment, the proximal portion 5 further comprises a bearing portion 27 extending between the lower side walls 14' and configured to be disposed opposite the lower wall 26 of the distal portion 6. This bearing portion 27 comprises a bearing stud 28 configured such that the lower wall 26 bears thereon upon fastening of the clip 8 to the bodywork element 2.

As illustrated in FIG. 9, the frangible region 9 and the material bridges 23 are broken when the airbag 3 is deployed. The distal portion 4 is disengaged from the proximal portion 5 and is displaced from its rest position to its deployment position, under the effect of the stresses generated by the deployment of the airbag 3. This displacement from the rest position to the deployment position enables the separation of the trim element 1 with respect to the bodywork element 2 and allows the full deployment of the airbag 3. The distal portion 4 is retained in the deployment position by cooperation of the stop members 24 with those of the retaining element 11, so that the trim element 1 is just displaced, without being projected into the passenger compartment upon deployment of the airbag 3.

FIG. 10 illustrates a variant which differs from the previous one in particular in that the bearing portion 27 of the proximal portion 5 comprises two bearing studs 28, configured to guarantee the balance of the distal portion 6 which can bear on the bearing stud 28 upon fastening of the clip 8. This configuration allows limiting the tensions that may be applied on the frangible region 9 in order to preserve it. According to other non-illustrated variants, the proximal portion 5 comprises another number of bearing studs 28 also configured to guarantee the bearing of the lower wall 26 and to preserve the frangible region 9.

According to a variant illustrated in FIG. 11, the distal portion 6 comprises a bottom wall 21 connecting the two side walls 14. The retaining assembly 100 comprises a bottom face 29 extending substantially parallel to the bottom wall 21. A guide rib 31 provided on the bottom face 29 is configured to cooperate with the bottom wall 21 and to guide the displacement of the distal portion 6 from its rest position to its deployment position.

Thus, the present invention provides a decisive improvement to the state of the art by proposing a retaining assembly 100 comprising a clip-holder 4 configured to be able to deploy while allowing an associated trim element 1 to remain retained to the bodywork element 2, which is simple to produce and economical. It allows using inexpensive standard clips and it is of course also adapted for the use of specific clips designed to deploy in cases requiring an increase of the stroke of the trim upon deployment of the airbag 3.

It goes without saying that the invention is not limited to the embodiments described above as examples but that it comprises all technical equivalents and variants of the described means as well as combinations thereof.

The invention claimed is:

1. An assembly for retaining a trim element to a bodywork element of a vehicle between which an airbag is intended to be interposed, the assembly comprising:
   the trim element, and
   a clip-holder made integrally in one piece with the trim element, comprising:
   a proximal portion connected to the trim element, and
   a distal portion on which is mounted a clip shaped for fastening to the bodywork element,
   the proximal portion and the distal portion being secured via a frangible region configured to break up upon deployment of the airbag, and
   the distal portion being displaceable between a rest position in which the frangible region secures the distal portion and the proximal portion and a deployment position in which the distal portion is disengaged from the proximal portion by breakage of the frangible region, and
   a retaining element configured to retain the distal portion to the trim element when the distal portion is in the deployment position, wherein the distal portion comprises a mounting wall provided with a mounting orifice, configured to cooperate with a complementary mounting member provided on the clip for mounting the clip on the distal portion.

2. The assembly according to claim 1, wherein the retaining element is made in one piece with the trim element.

3. The assembly according to claim 2, wherein the frangible region comprises a breakable material area configured to break up upon deployment of the airbag and to disengage the distal portion from the proximal portion.

4. The assembly according to claim 3, comprising a support portion generally having a U-shape, disposed opposite the complementary mounting member of the clip mounted on the mounting wall, the support portion being configured to support the complementary mounting member upon fastening of the clip to the bodywork element.

5. The assembly according to claim 4, comprising breakable material bridges between the retaining element and the distal portion in the rest position, these material bridges being configured to break up when the distal portion is displaced in the deployment position.

6. The assembly according to claim 1, wherein the frangible region comprises a breakable material area configured to break up upon deployment of the airbag and to disengage the distal portion from the proximal portion.

7. The assembly according to claim 1, comprising a support portion generally having a U-shape, disposed opposite the complementary mounting member of the clip mounted on the mounting wall, the support portion being configured to support the complementary mounting member upon fastening of the clip to the bodywork element.

8. The assembly according to claim 7, wherein the distal portion comprises two side walls facing each other, attached to two opposite peripheral sides of the mounting wall, and wherein the support portion is connected to the two side walls by a return portion.

9. The assembly according to claim 8, wherein the distal portion comprises a lower wall connected to the mounting wall by the two side walls, and wherein the proximal portion comprises at least one bearing stud disposed opposite the lower wall, the at least one bearing stud being configured to allow enable a bearing of the lower wall when the clip is fastened to the bodywork element.

10. The assembly according to claim 1, comprising breakable material bridges between the retaining element and the distal portion in the rest position, these material bridges being configured to break up when the distal portion is displaced in the deployment position.

11. The assembly according to claim 1, wherein the distal portion comprises a stop member configured to bear against a complementary stop member provided on the retaining element when the distal portion is in the deployment position.

12. The assembly according to claim 1, wherein the distal portion comprises a bottom wall connecting the same side of two side walls, and the assembly further comprising a bottom face extending substantially parallel to the bottom wall, the bottom face comprising a guide rib configured to guide the displacement of the bottom wall of the distal portion from its rest position to its deployment position.

13. The assembly according to claim 1, wherein the retaining element comprises an elastic member configured to take on a compressed position when the distal portion is in the rest position, and a loose position, when the distal portion is in the deployment position, in which a length of the elastic member is greater than the length of the elastic member in the compressed position.

14. The assembly according to claim 1, wherein the retaining element comprises a flexible cord where a first end region of the cord is connected to the distal portion and a second end region is connected to the proximal portion of the clip-holder, the cord being configured to take on a loose position when the distal portion is in the rest position, in which the cord is loosened, and a stretched position when the distal portion is in the deployment position, in which the cord is extended.

15. A vehicle comprising:
a bodywork element, and
the assembly according to claim 1.

16. The vehicle according to claim 15, wherein the trim element and the clip-holder are integral and comprise a plastic material such as polypropylene.

* * * * *